through active laser element 90. Lens 92, polarizer 93, and quartz face plate 94 have similar construction and purpose to those illustrated in FIG. 1. Quartz face plate 94 is mounted on a dual beam cathode ray tube 95, which contains electro-optic crystal 96. This crystal may have a transparent, conductive grounded coating 97 on its front surface and two arrays 98 of conductive, reflecting strips on its back surface. These two arrays 98 are more fully described in connection with FIGS. 6 and 7. Because the embodiment of FIG. 5 is folded, with a mirror at the symmetry plane, the image of one of the arrays in plane 98 is reflected back to the same plane and is imaged on the other one of the two arrays to create a number of intersection points or regions where the image of one strip crosses a strip in the other array. Thus, when electron beams 99 and 100 respectively strike one of the two strips having intersection regions at points 101 and 102, these points 101 and 102 become able to support oscillation between them. The two points form a resonant cavity for the generation of folded laser beam 103.

FIGS. 6 and 7 are planar and cross-sectional views of a pair of arrays of reflecting conducting strips on an electro-optic crystal which may be used in FIG. 5. FIG. 6 illustrates an electro-optic crystal having a first region 110 and a second region 111. A first plurality of reflecting conductive strips 112–115 is shown placed on a first surface area, which is the upper surface of region 110 as shown in FIG. 6. A second plurality of reflecting, conductive strips 120–126 is shown placed on a third surface area, which is the upper surface of the crystal region 111. These conducting strips are all connected to ground through separate resistors, as previously described in connection with the embodiment of FIG. 2.

FIG. 7 is a cross-sectional representation of the arrangement illustrated in FIG. 6. Surface areas 130 and 131, respectively the second surface area, located in crystal region 110 and the fourth surface area, located in crystal region 111, may be covered by a transparent, conductive electrode 135, which is connected to ground. An anti-reflective coating 136 may be placed over the transparent, conducting electrode 135. Both coatings 135 and 136 may extend over a support member 137.

Of course, it is obvious that the conductive, reflecting strips illustrated on the electro-optic crystals may be much more closely spaced than is illustrated, and that the spacing shown is for ease of illustration only. In practice, for example, FIG. 6 might represent a two-inch square KDP crystal having a series of silver strips 25 microns wide and 25 microns apart placed on its surface. Thus, the first surface area, in upper region 110 of the crystal, would have 500 longer strips on it, and the third surface area, in lower region 111 of the crystal, would have 1000 shorter strips on its surface. Each of these longer conducting strips might have a capacitance of, for example, about 0.2 picofarad. If the desired time constant of this system were about 200 nanoseconds, then the associated series resistors might each have a value of about 1 megohm. If the shorter strips had a capacitance of 0.1 picofarad, their associated resistors might have a value of 2 megohms. The entire electrode arrangement, including the leakage resistors, is probably most economically fabricated by photolithography.

While the invention has been particularly shown and described with reference to preferred embodiments thereof, it will be understood by those skilled in the art that various changes in form and details may be made therein without departing from the spirit and scope of the invention.

What is claimed is:

1. In an apparatus for controlling the direction of a laser beam, including an active element capable of generating a coherent light beam along a plurality of differently oriented paths through said active element, and cavity means defining a resonant cavity for controlling along which of said paths coherent light is generated, thereby controlling the direction of said laser beam, said cavity means comprising at least first and second reflector means, the improvement wherein:
    (a) said first reflector means comprises:
        (1) a first electro-optic crystal means having a first and a second surface areas, and
        (2) a first plurality of reflecting, conductive strips on said first surface area,
    (b) said second reflector means comprises:
        (1) a second electro-optic crystal means having a third and a fourth surface areas, and
        (2) a second plurality of reflecting, conductive strips on said third surface area,
    (c) means for placing an electrical charge on a selected strip from each of said first and second plurality of strips to create an electrostatic potential at each selected strip, and
    (d) bias means located between said active element and each of said first and second reflector means for attenuating the amount of light reflected back through said active element by each of said reflecting strips other than an electrically charged selected strip, whereby light is reflected by said electrically charged selected strips back through said active element in a relatively non-attenuated amount sufficient to cause said active element to generate a beam of coherent light along at least one of said plurality of differently oriented paths corresponding to the path of the relatively non-attenuated light.

2. An apparatus according to claim 1 wherein said means for placing an electrical charge further comprises:
    (a) means for generating first and second electron beams,
    (b) means for aiming said first electron beam to place a charge on said selected strip from said first plurality of strips, and
    (c) means for aiming said second electron beam to place a charge on said selected strip from said second plurality of strips.

3. An apparatus according to claim 2 wherein:
    (a) each strip from said first and second plurality of strips is connected through a separate resistor to a point of common potential.

4. An apparatus according to claim 3 wherein each of said separate resistors is a photoresistor, and wherein said apparatus further includes light producing means for controlling the resistance of said photoresistors.

5. An apparatus according to claim 2 wherein each strip of said first and second plurality of strips contains, in one end region thereof, a relatively wider, fanned-out area for receiving electrons from its associated electron beam.

6. An apparatus according to claim 1 further comprising:
    (a) a third reflector means for optically folding said cavity, and
    (b) said first and second reflector means being situated adjacent to each other on the side of said active element removed from said third reflector means, whereby a beam of coherent light generated between points on said first and second reflector means is folded by said third reflector means to pass through said active element in two modes.

7. An apparatus according to claim 6 wherein said third reflector means comprises a partially transparent, partially reflective mirror, whereby beams of coherent light striking said third reflector means are partially reflected to maintain oscillations in said active element and are partially transmitted to provide output beams.

8. In an apparatus for controlling the direction of a laser beam, including an active element capable of generating a coherent light beam along a plurality of differently oriented paths through said active element, and cavity means defining a resonant cavity for controlling Jan. 26, 1971  G. BURNS ET AL  3,559,185

OPTICAL SWITCH

Filed Aug. 7, 1968  2 Sheets-Sheet 1

INVENTORS
GERALD BURNS
ARCHIBALD W. SMITH
WILLIAM V. SMITH

BY
ATTORNEY ns Patent Office
3,559,185
Patented Jan. 26, 1971

3,559,185
OPTICAL SWITCH
Gerald Burns, Yorktown Heights, Archibald W. Smith, Briarcliff Manor, and William V. Smith, Chappaqua, N.Y., assignors to International Business Machines Corporation, Armonk, N.Y., a corporation of New York
Filed Aug. 7, 1968, Ser. No. 750,855
Int. Cl. G11c 11/42
U.S. Cl. 340—173
7 Claims

ABSTRACT OF THE DISCLOSURE

A crystalline material gadolinium molybdate,

has been determined to have reversible birefringence, the sign of the birefringence depending upon the direction of polarization along the ferroelectric axis of the

crystal. Thus, if the ferroelectric axis is chosen as the c-axis (or optical axis), the a-axis and b-axis are two other crystallographic axes that are perpendicular to such c-axis, and the index of refraction of light polarized along the a-axis is different from the index of refraction of light polarized along the b-axis. The property of the reversibility of the birefringence enables one to optically sense the direction of light sent through the crystal, parallel to the c-axis. Such a crystal can be used in various optical switching and memory devices.

BACKGROUND OF THE INVENTION

The characteristics of reversible longitudinal birefringence are not new with this invention. Rochelle salts and potassium dihydrogen phosphate (KDP) crystals exhibit reversible birefringence. However KDP does not possess this characteristic at room temperature. The KDP crystals must be cooled to —150° C. or —60° C. to be useful as a reversibly birefringent material. Rochelle salts, on the other hand, do manifest reversible birefringence at room temperature, but they are difficult to process into thin slabs, they are hygroscopic and will tend to deteriorate unless the moisture content of the environment is carefully controlled and, in general, are cumbersome materials to use in optical instruments. $Gd_2(MoO_4)_3$ is a hard crystalline material that can be readily cut into very thin slabs, is highly resistive to wide atmospheric changes in pressure, temperature and humidity and exhibits longitudinal reversible birefringence at room temperature.

Accordingly a specific object of the invention is to provide an improved optical switch or memory that exploits the characteristic of reversible birefringence.

Yet another object is to achieve such novel optical switch or memory that is operable at room temperature.

Still a further object is to use a crystal of $Gd_2(MoO_4)_3$ as the ferroelectric material for achieving such improved ferroelectric optical switch or memory.

SUMMARY OF THE INVENTION

The preceding objectives are achieved by taking a boule (1 cm. in diameter and about 5 cm. long) of $Gd_2(MoO_4)_3$ grown by the well-known Czochralski technique; such growth and various crystal characteristics are discussed in an article entitled "$Gd_2(MoO_4)_3$: A Ferroelectric Laser Host" by Hans J. Borchardt et al. appearing in the Applied Physics Letters of Jan. 15, 1966, vol. 8, No. 2, pp. 50–52. The boule is cut into slices that are 1 mm. thick and opposing parallel faces of each slice are perpendicular to the optical axis (or c-axis) of the crystal of the $Gd_2(MoO_4)_3$. Silver is deposited on the parallel faces after the cut crystal has been optically polished so that suitable electrical potentials can be applied to the crystal through said silver. The films of silver are sufficiently thin so as to be transparent to light.

Linearly polarized light is made to propagate along the ferroelectric (c-axis) axis and $Gd_2(MoO_4)_3$ breaks up the polarized light into two components vibrating at right angles to each other along axis-a and axis-b, the latter lying in a plane that is perpendicular to the c-axis. The beam of light existing from the crystal is elliptically polarized in that the $Gd_2(MoO_4)_3$ is birefringent and the index of refraction along the a-axis differs from the index of refraction along the b-axis. By selecting the appropriate thickness along the c-axis, the two components of polarized light are made 90° out of phase with each other when they emerge, producing circularly polarized light.

The circularly polarized light can be either in a clockwise or a counterclockwise direction. Once the sign of the birefringence is known, i.e., polarized either upwardly or downwardly through the crystal parallel to the c-axis, the ferroelectric element serves as a binary memory. The upward oriented polarization can be considered to be the storage of a binary "1" and the downwardly oriented polarization can be considered as "0." When circularly polarized light exits from the crystal of $Gd_2(MoO_4)_3$, a quarter-wave plate of $Gd_2(MoO_4)_3$ is inserted in the path of the exiting light, and such λ/4 plate restores the circularly polarized light to linearly polarized light. The resulting plane of polarization is now either parallel to or perpendicular to the original plane of polarization, depending upon the sign of polarization of the gadolinium molybdate. An analyzer and detector or used in conjunction with the λ/4 plate to sense the sign, hence the binary state, of the $Gd_2(MoO_4)_3$ crystal. The manner in which the invention is extended to serve either an a memory, a switch or as a display will be described in the detailed description that follows.

The foregoing and other objects, features and advantages of the invention will be apparent from the following more particular description of preferred embodiments of the invention as illustrated in the accompanying drawings.

DESCRIPTION OF THE PREFERRED
EMBODIMENTS

Figure 1:
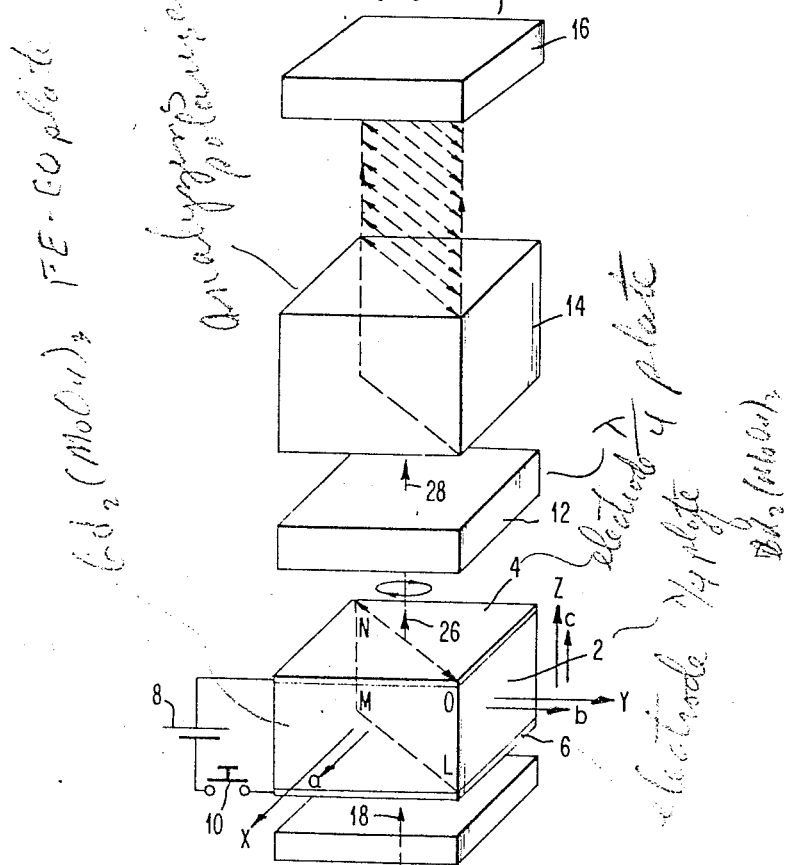
FIG. 1 is a schematic view of an embodiment of the invention used an a binary memory cell or as an optical switch.
Figure 2A:
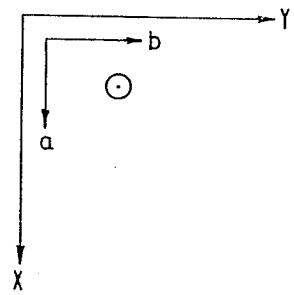
FIGS. 2a and 2b are vector diagrams illustrating the characteristic of reversible birefringence.
Figure 2B:
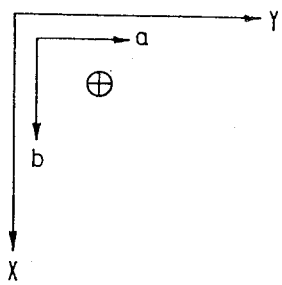
Figure 3:
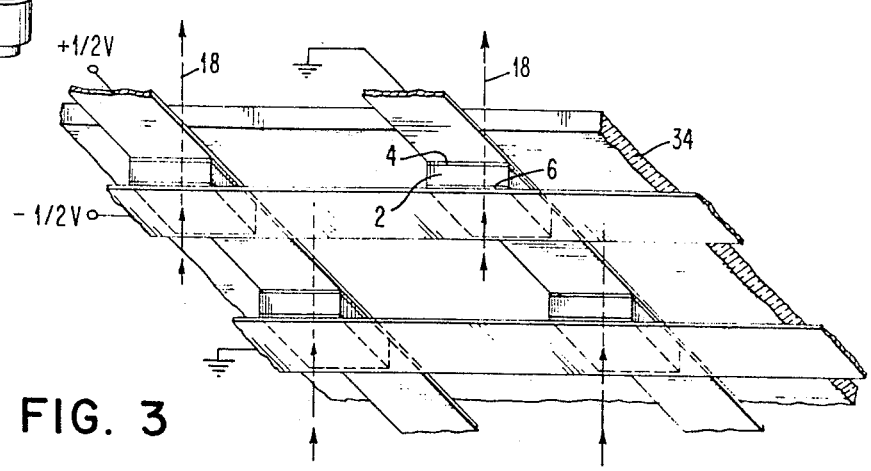
FIG. 3 is a schematic diagram of a memory array wherein each memory cell is composed of a ferroelectric crystal of $Gd_2(MoO_4)_3$.
Figure 4:
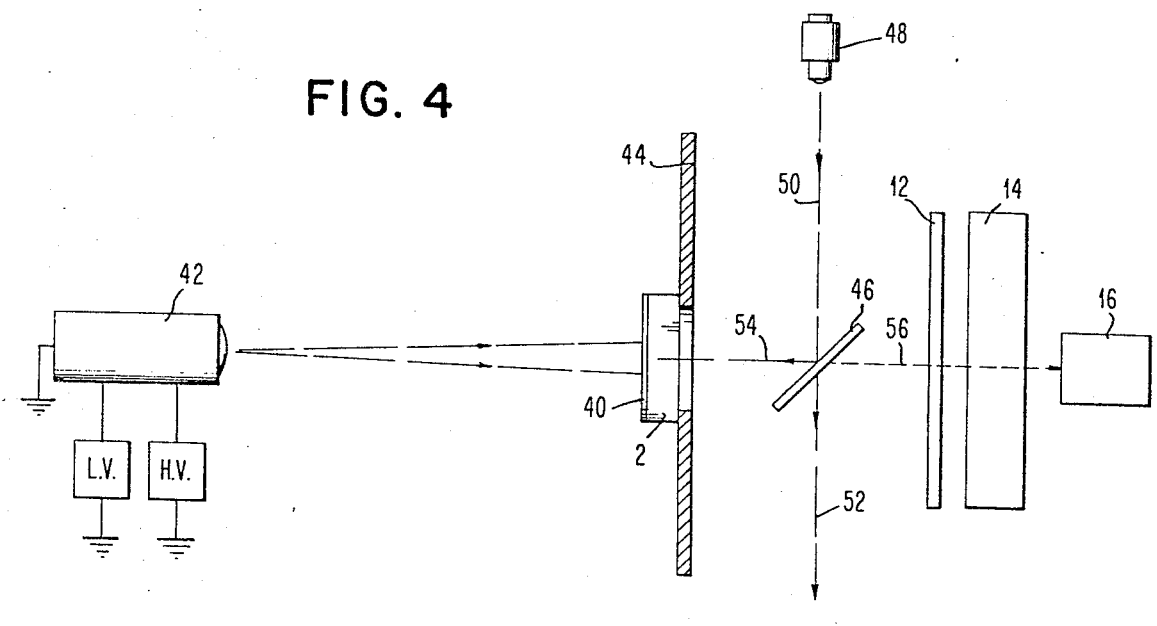
FIG. 4 is a display or memory employing $Gd_2(MoO_4)_3$ as the novel ferroelectric material for effecting the memory or display function.
Figure 5:
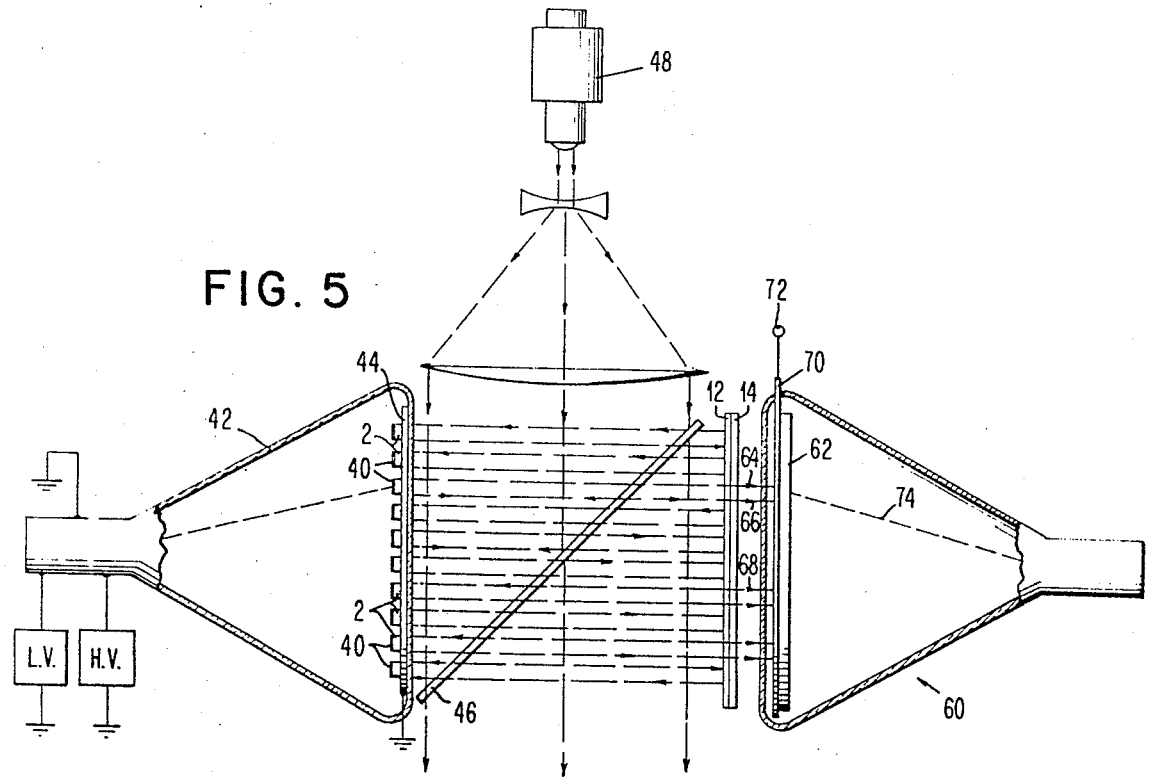
FIG. 5 is a showing of a circuit for reading out the information stored in the memory or display of FIG. 4.

In FIG. 1 there is shown a cube 2 of $Gd_2(MoO_4)_3$ that is cut so as to be 1 mm.² and 1 mm. thick although the gadolinium molybdate could be cut into the shape of a cylinder whose base is approximately 1 cm. in diameter, or into any shape that is desirable. Assume that the inherent polarization of the crystal is along the crystallographic c-axis, the top face 4 and bottom face 6 are parallel and at right angles to the optic axis or c-axis. The a-axis and b-axis are two crystallographic axes that lie in a plane that is perpendicular to the c-axis. A battery 8 and switch 10 represent one way of applying an electric field that is parallel to the c-axis. It is understood that any con-